US011068038B2

(12) United States Patent
Muccini et al.

(10) Patent No.: US 11,068,038 B2
(45) Date of Patent: Jul. 20, 2021

(54) SYSTEM AND METHOD FOR USING CURRENT SLEW-RATE TELEMETRY IN AN INFORMATION HANDLING SYSTEM

(71) Applicant: DELL PRODUCTS, LP, Round Rock, TX (US)

(72) Inventors: Mark A. Muccini, Georgetown, TX (US); Wade Andrew Butcher, Cedar Park, TX (US); John Erven Jenne, Austin, TX (US)

(73) Assignee: Dell Products L.P.

( * ) Notice: Subject to any disclaimer, the term of this patent is extended or adjusted under 35 U.S.C. 154(b) by 21 days.

(21) Appl. No.: 16/577,550

(22) Filed: Sep. 20, 2019

(65) Prior Publication Data

US 2021/0089106 A1    Mar. 25, 2021

(51) Int. Cl.
*G06F 1/3206* (2019.01)
*G06F 13/40* (2006.01)
*G06F 13/42* (2006.01)
*G06F 1/3296* (2019.01)

(52) U.S. Cl.
CPC .......... *G06F 1/3206* (2013.01); *G06F 1/3296* (2013.01); *G06F 13/4072* (2013.01); *G06F 13/4282* (2013.01)

(58) Field of Classification Search
CPC .......... H02H 7/0822; H02H 3/08; H02H 3/44; H02H 1/043; H02H 1/0015; H02H 9/001; H02H 9/002; H02H 9/025; G06F 1/26; G06F 1/28; G06F 1/3203; G06F 1/3206; G06F 1/30; G06F 1/266; G06F 1/305

USPC .......... 327/170; 713/300, 330, 340; 361/42, 361/93.1, 93.9, 87, 63
See application file for complete search history.

(56) References Cited

U.S. PATENT DOCUMENTS

| | | | | |
|---|---|---|---|---|
| 5,181,155 A | * | 1/1993 | Beg | H02H 3/44 361/94 |
| 5,267,545 A | * | 12/1993 | Kitson | H03K 17/64 123/490 |
| 5,663,667 A | * | 9/1997 | Blum | H02M 3/33507 327/110 |
| 6,476,683 B1 | * | 11/2002 | Saito | H03K 7/08 332/109 |
| 6,968,465 B2 | | 11/2005 | Freevol et al. | |
| 7,200,701 B2 | | 4/2007 | Stultz | |
| 7,344,202 B2 | * | 3/2008 | Linebach | B60L 9/005 303/113.2 |
| 7,613,861 B2 | | 11/2009 | Rangarajan et al. | |
| 7,721,034 B2 | | 5/2010 | Wang et al. | |
| 8,918,690 B2 | | 12/2014 | Hanagandi et al. | |
| 9,130,659 B2 | | 9/2015 | Nii et al. | |
| 9,161,871 B2 | * | 10/2015 | Clement | A61G 7/1046 |
| 9,875,171 B2 | | 1/2018 | Mizutani | |

(Continued)

*Primary Examiner* — Faisal M Zaman
(74) *Attorney, Agent, or Firm* — Larson Newman, LLP

(57) ABSTRACT

An information handling system includes a current detector module and a baseboard management controller (BMC). The current detector module is configured to detect current slew-rate for an element of the information handling system, to determine that the current slew-rate is greater than a current slew-rate threshold, and to provide an indication that the current slew-rate is greater than the current slew-rate threshold on a communication interface. The BMC may enter an item into a log of the information handling system in response to receiving an indication.

20 Claims, 3 Drawing Sheets

(56) References Cited

U.S. PATENT DOCUMENTS

| | | | |
|---|---|---|---|
| 9,971,605 B2 | 5/2018 | Henry et al. | |
| 2002/0053905 A1* | 5/2002 | Bell | H03K 19/01721 |
| | | | 324/306 |
| 2002/0060592 A1* | 5/2002 | Shimoda | H03K 5/135 |
| | | | 327/170 |
| 2006/0179199 A1 | 8/2006 | Stern et al. | |
| 2007/0097869 A1* | 5/2007 | Wang | H04L 61/2076 |
| | | | 370/241 |
| 2008/0285184 A1* | 11/2008 | Phadke | H02H 7/1203 |
| | | | 361/1 |
| 2009/0049221 A1 | 2/2009 | Rangarajan et al. | |
| 2009/0248934 A1 | 10/2009 | Ge et al. | |
| 2013/0162250 A1* | 6/2013 | Sabate | G01R 33/3852 |
| | | | 324/309 |
| 2014/0101475 A1* | 4/2014 | Berke | G06F 1/3206 |
| | | | 713/340 |
| 2014/0181544 A1 | 6/2014 | Breen et al. | |
| 2016/0266626 A1* | 9/2016 | Bandholz | G06F 1/266 |
| 2020/0249736 A1* | 8/2020 | Walker | G01R 19/16547 |
| 2020/0280308 A1* | 9/2020 | Gunasekaran | H03K 17/0822 |
| 2020/0321768 A1* | 10/2020 | Schegner | H02H 1/0015 |
| 2020/0412303 A1* | 12/2020 | Astgimath | H03F 1/086 |

\* cited by examiner

SYSTEM AND METHOD FOR USING CURRENT SLEW-RATE TELEMETRY IN AN INFORMATION HANDLING SYSTEM

FIELD OF THE DISCLOSURE

This disclosure generally relates to information handling systems, and more particularly relates to a system and method for using current slew-rate telemetry in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a current detector module and a baseboard management controller (BMC). The current detector module may be configured to detect current slew-rate for an element of the information handling system, to determine that the current slew-rate is greater than a current slew-rate threshold, and to provide an indication that the current slew-rate is greater than the current slew-rate threshold on a communication interface. The BMC may be coupled to the communication interface. The BMC may enter an item into a log of the information handling system in response to receiving the indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
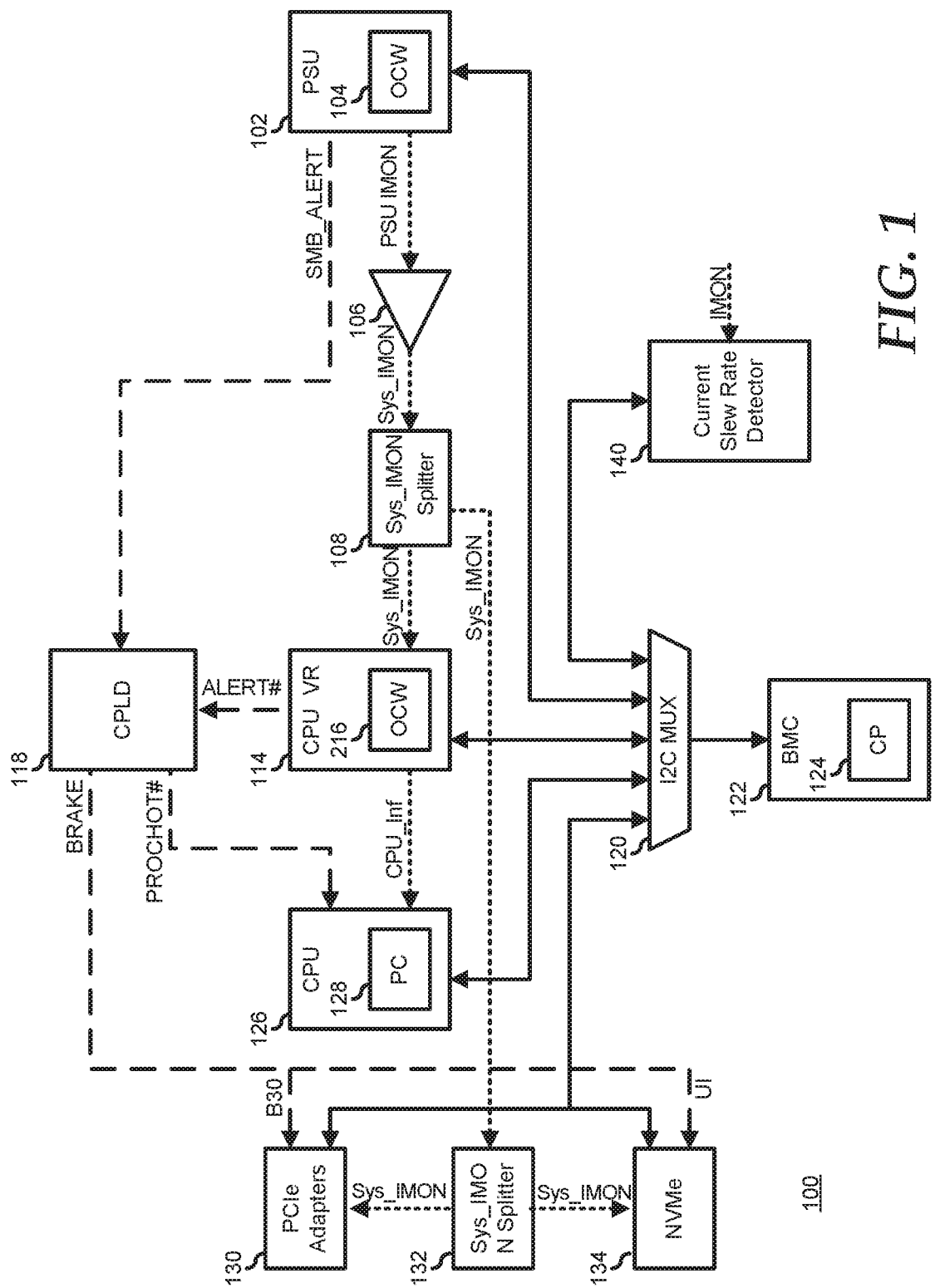
FIG. 1 is a block diagram of a power control system for an information handling system according to an embodiment of the present disclosure.
Figure 2:
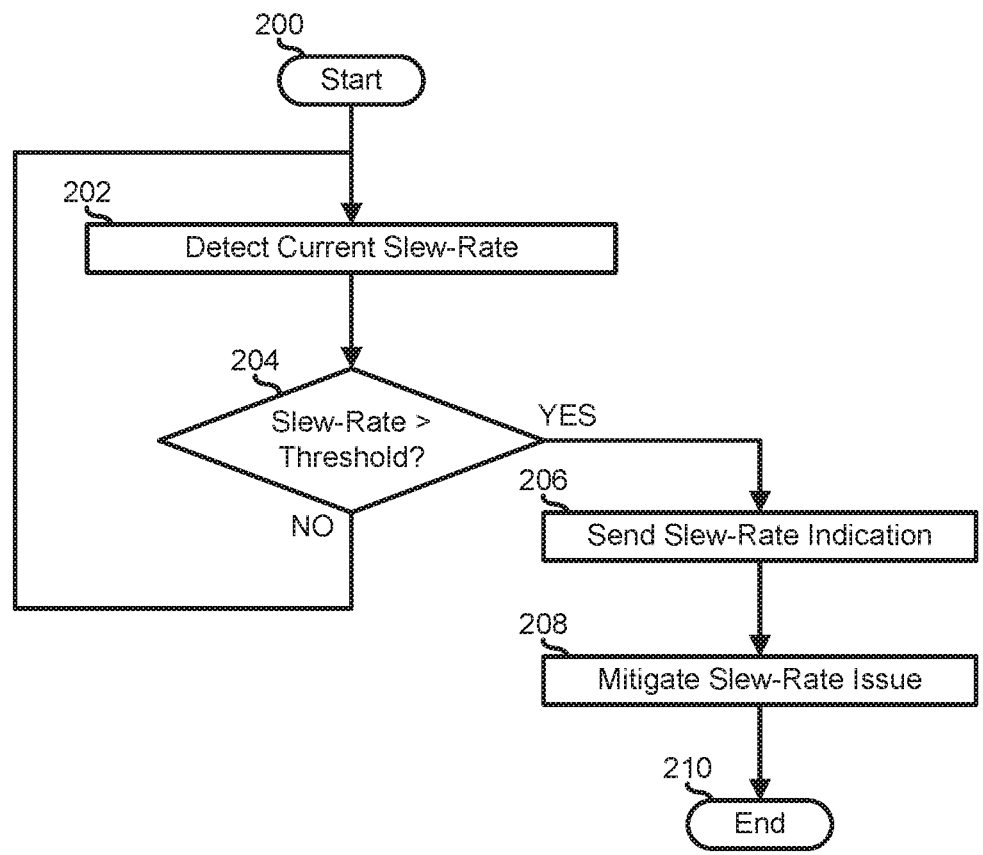
FIG. 2 is a flowchart illustrating a method for using current slew-rate telemetry in an information handling system according to an embodiment of the present disclosure.

FIG. 1 illustrates a power control system 100 for an information handling system. Power control system 100 includes one or more PSU 102, a current monitor combiner 106, a system current monitor splitter 108, one or more CPU VR 114, a complex programmable logic device (CPLD) 118, an Inter-Integrated Circuit (I2C) interface multiplexor (I2C MUX) 120, a baseboard management controller (BMC) 122, one or more CPU 128, one or more PCIe adapter 130, another system current monitor splitter 132, one or more Non-Volatile Memory Express (NVMe) interface 134, and a current slew-rate detector module 140. It will be understood that power control system 100 is representative of the various monitoring, management, and control aspects of an overall power system for an information handling system, and that FIG. 1 is not intended to show the actual power distribution network of the subject information handling system. A simplified power supply system is shown in FIG. 2, as described further, below.

PSU 102 represents a switching power converter device that receives input power (typically an alternating current (AC) power line input) and provides one or more output voltage rails (typically direct current power rails). PSU 102 is configurable to operate in various operating modes, such as a standby mode, a normal power mode, and a constant current mode. Further, based upon various platform power states enacted on the information handling system, one or more of the voltage rails may be powered on while other power rails are powered off. As such, PSU 102 includes an I2C interface that is connected via I2C MUX 120 to BMC 122 and that permits the communication of various status and configuration information to the BMC and the receipt of various control information from the BMC, as described further below. In addition, PSU 102 provides various hardware status signals to power control system 100. Such hardware status signals may include various bi-state signals, such as an over-current warning (OCW), as provided by an OCW module 104, a power-ok signal (POK), a constant current (CC) signal, an input voltage status (Vin_Good) signal, a System Management Bus (SMB) alert (SMB_ALERT) signal, or other bi-state status signals, as needed or desired. The hardware status signals may also include various analog signals such as a PSU current level (PSU_I-MON) signal, or other analog signals, as needed or desired. The SMB_ALERT signal is provided to CPLD 118 in response to an over-current warning provided by OCW module 104, as described further below.

In a particular embodiment, the PSU_IMON signal is a voltage level signal, such as where PSU 102 provides a current sense resistor in a main power source, and where the PSU_IMON signal is representative of the voltage across the sense resistor. In another embodiment, the PSU_IMON signal is a current level signal, such as where PSU 102 provides a current follower circuit whose output current is based upon the current of the main power source. In either embodiment, current monitor combiner 106 operates to receive the PSU current level (PSU_IMON signal from PSU 102 and other PSU current level signals from the one or more additional PSUs of power control system 100, and to combine the PSU current level signals to provide a system current level (Sys_IMON) signal. For example, where the PSU_IMON signals are voltage level signals, the Sys_IMON signal can be provided as an output of a voltage adder circuit such that the Sys_IMON voltage is proportional to the sum of the PSU_IMON voltages. In another example, where the PSU_IMON signals are current level signals, the Sys_IMON signal can be provided as an output of a current adder circuit such that the Sys_IMON current is proportional to the sum of the PSU_IMON currents. It will be understood that where a particular PSU is dedicated to providing power for a particular portion of an information handling system, such as a sub-system of the information handling system, that a current monitor combiner similar to current monitor combiner 106 may be utilized to provide a current level signal for the portion or sub-system of the information handling system, as needed or desired. Note that the Sys_IMON signal is indicative of a total amount of current being provided by PSU 102 and the one or more additional PSUs, and should not be confused with a total current being provided to a load of the information handling system.

In a typical information handling system, the Sys_IMON signal is received by CPU VR 114 as a current proportional signal, and the CPU VR conditions the power provided to CPU 126 based upon the Sys_IMON signal. For example, CPU VR 114 can determine that PSU 102 is providing less than a fully rated power level to the information handling system, and in response, the CPU VR can increase one or more of an operating frequency and a voltage level to CPU 126 to increase the performance of the CPU, thereby utilizing more of the power capacity of PSU 102. In another example, CPU VR 114 can determine that PSU 102 is providing at or near the fully rated power level to the information handling system, and in response, the CPU VR can decrease one or more of the operating frequency and the voltage level to CPU 126 to decrease the performance of the CPU, thereby reducing the power utilization of PSU 102. In a typical case, the Sys_IMON signal can be utilized to optimize the power consumption of the memory devices. For example, CPU 126 may throttle the memory devices or other subsystems of information handling system in response to the Sys_IMON signal, or BMC 122 can perform the throttling in response to the Sys_IMON signal. As such, the Sys_IMON signal is utilized in power control system 100 to prospectively inform CPU VR 114 of power conditions on the information handling system, such that the CPU VR can proactively respond to the power conditions to better utilize PSU 102. CPU VR 114 provides information as to the status and operation of the CPU VR (CPU_Inf) to CPU 126, such that the CPU can condition the processing operations of the CPU upon the information, as needed or desired. CPU VR 114 further includes an I2C interface that is connected via I2C MUX 120 to BMC 122 and that permits the communication of various status and configuration information to the BMC and the receipt of various control information from the BMC, as described further below. In addition, CPU VR 114 provides an over-current alert (ALERT #), as provided by an OCW module 116 to CPLD 118, as described further below.

In the present embodiment, power control system 100 provides the Sys_IMON signal to PCIe adapter 130, to NVMe interface 134, and to other elements of the information handling system, so that the PAU, the PCIe adapter, the NVMe interface and the other elements of the information handling system may prospectively be informed of the power conditions on the information handling system, and can proactively respond to the power conditions to better utilize PSU 102. However, because the Sys_IMON signal is a current proportional signal, the Sys_IMON signal cannot be fanned out to PCIe adapter 130, to NVMe interface 134, and to other elements of the information handling system directly. Instead, the Sys_IMON signal from current monitor combiner 106 is provided to system current monitor splitter 108 to generate multiple copies of the Sys-IMON signal. In particular, system current monitor splitter 108 provides individual copies of the Sys_IMON signal to CPU VR 114, and to system current monitor splitter 132. Further, system current monitor splitter 132 provides individual copies of the Sys_IMON signal to PCIe adapter 130 and to NVMe interface 134. For example system current monitor splitters 108 and 132 can utilize current mirror circuits that generate one or more mirrored current signal outputs based upon a received current signal input. CPU VR 114 is typically provided in conjunction with or by a manufacturer of CPU 126. As such, the requirements associated with the Sys_IMON signal are typically defined by a specification for CPU VRs that may be published by the manufacturer of the CPU. For example, the Sys_IMON signal may be analogous to various system level power signals as specified in various specifications published by one or more microprocessor manufacturer. Here, each device of power control system 100 that receives Sys_IMON will be understood to be in compliance with the particular CPU VR specification.

CPLD 118 represents a programmable device that provides various logic functions for the information handling system that utilizes power control system 100. In particular, CPLD 118 includes multiple general purpose I/O (GPIOs) and is programmed to provide various relations between the signals received on the GPIOs and the signals provided on the GPIOs. As such, CPLD 118 is configured to receive the SMB_ALERT signal from PSU 102, and the ALERT #signal from CPU VR 118. CPLD 118 is further configured to provide a processor over-temperature signal (PROCHOT #) to CPU 126 and power brake (BRAKE) signals to PCIe adapter 130 (B30), and NVMe interface 134 (UI), as described further below.

PCIe adapter 130 represents one or more PCIe root ports and endpoint devices of the information handling system that includes power control system 100. In a particular embodiment, the Sys_IMON signal is received by PCIe adapter 130 as a current proportional signal as split by Sys_IMON splitter 132. In another embodiment, where PCIe adapter 130 is configured to receive a voltage proportional signal, the Sys_IMON signal is converted into the voltage proportional signal, such as by including a to convert the current proportional signal to the voltage proportional signal. In either case, PCI adapter 130 conditions its power profile based upon the Sys_IMON signal. For example, PCIe adapter 130 can determine that PSU 102 is providing less than a fully rated power level to the information handling system, and in response, the PCIe adapter can increase its performance, thereby utilizing more of the power capacity of PSU 102. In another example, PCIe adapter 130 can determine that PSU 102 is providing at or near the fully rated power level to the information handling system, and in response, the PCIe adapter can decrease its performance, thereby reducing the power utilization of PSU 102. PCIe adapter 130 further includes an I2C interface that is connected via I2C MUX 120 to BMC 122 and that permits the communication of various status and configuration information to the BMC and the receipt of various control information from the BMC, as described further below. It will be understood that PCIe adapter 130 may represent two or more PCIe adapters that each receive a separate Sys_IMON signal from Sys_IMON splitter 132, as needed or desired.

NVMe interface 134 represents one or more non-volatile memory controller of the information handling system that includes power control system 100. In a particular embodiment, the Sys_IMON signal is received by NVMe interface 134 as a current proportional signal as split by Sys_IMON splitter 132. In another embodiment, where NVMe interface 134 is configured to receive a voltage proportional signal, the Sys_IMON signal is converted into the voltage proportional signal, such as by including a to convert the current proportional signal to the voltage proportional signal. In either case, NVMe interface 134 can determine that PSU 102 is providing less than a fully rated power level to the information handling system, and in response, the NVkle interface can increase its performance, thereby utilizing more of the power capacity of PSU 102. In another example, NVMe interface 134 can determine that PSU 102 is providing at or near the fully rated power level to the information handling system, and in response, the NVMe interface can decrease its performance, thereby reducing the power utilization of PSU 102. NVMe interface 130 further includes an I2C interface that is connected via I2C MUX 120 to BMC 122 and that permits the communication of various status and configuration information to the BMC and the receipt of various control information from the BMC, as described further below. It will be understood that NVMe interface 134 may represent two or more NVMe interfaces that each receive a separate Sys_IMON signal from Sys_IMON splitter 132, as needed or desired. It will be further understood that the I2C interface of NVMe interface may share a common I2C bus with the I2C interface of PCIe adapter 130. Further, it will be understood that power management system 100 may include one or more additional subsystem, such as a network interface device (NIC), a storage adapter, or another subsystem of an information handling system that may receive the Sys_IMON signal and adapt the performance of the subsystem accordingly, as needed or desired.

I2C MUX 120 operates to multiplex I2C busses from PSU 104, CPU VR 114, CPU 126, PCIe adapters 130, and NVMe interface 134 to an I2C interface of BMC 122. Here, BMC 122 operates to monitor, manage, and maintain the operations of PSU 104, CPU VR 114, CPU 126, PCIe adapters 130, and NVMe interface 134 via communications over the various I2C busses. In particular, BMC 122 may include a processor that runs management code to perform the functions of the BMC, and may further include a co-processor that, under the direction of the management code, offloads the BMC processor from various repetitive tasks, such as I2C service routines. It will be understood that the configuration of the I2C busses and I2C MUX 120 are exemplary, and that the information handling system that utilizes power control system 100 may employ an I2C bus configuration that is different than the one shown herein. Moreover, it will be understood that the communications between BMC 122 and PSU 104, CPU VR 114, CPU 126, PCIe adapters 130, and NVMe interface 134 may be via other communication standards, as needed or desired. For example, the communication between BMC 122 and CPU 126 may be channeled via an I2C bus to a Platform Controller Hub (PCII) that is in communication with the CPU, or the BMC may communicate directly with the CPU via a Platform Environment Control Interface (PECI), as needed or desired.

Current slew-rate detector module 140 represents a high-speed analog-to-digital converter (ADC) that receives as an input the current provided at a particular location on the information handling system that utilizes power control system 100. Current slew-rate detector module 140 operates to detect the rate of rise (slew-rate) in the current supplied at the particular location. Current slew-rate detector module 140 includes a I2C interface and operates to communicate indications related to the current slew-rate at the particular location to BMC 122. It will be understood that power control system 100 may include more than one current slew-rate detector module similar to current slew-rate detection module 140, each to receive as an input the current provided at a different location on the information handling system and to detect the current slew-rate in the current supplied at the different locations. For example, power control system 100 can include current slew-rate detector modules that are associated with the overall system current for each particular voltage rail from PSU 102, current slew-rate detector modules that are associated with particular subsystems of the information handling system, such as memory subsystems, I/0 subsystems, or the like, current slew-rate detector modules that are associated with one or more CPU VR or VR controller, or the like, as needed or desired.

In particular, current slew-rate detector module 140 can receive one or more of the IMON signals from power control system 100. For example, current slew-rate detector module 140 can be integrated into CPU VR 114, and the features of the current slew-rate detector module as described herein can be based upon the Sys_IMON signal. Here, CPU VR 114 can determine a power or current delta between multiple samples of the received Sys_IMON signal over a given time period to calculate the system-level slew-rate. Then, if CPU VR 114 detects a slew-rate that is above one or more preprogrammed thresholds, the CPU VR can trigger various warnings or actions as described herein. In another example, other endpoint devices or subsystems of the information handling system can support associated IMON outputs, or IMON devices could be placed on the voltage feeds to various subsystems to be provided to current slew-rate detector module 140 to provide the features of the current slew-rate detector module as described herein.

Current slew-rate detector module 140 operates to detect the current slew-rate supplied at its associated location, and to provide indications as to the current slew-rate to BMC 122 via the I2C interface. In a particular embodiment, current slew-rate detector 140 implements one or more current slew-rate thresholds. Here, current slew-rate detector module 140 provides indications when the one or more current slew-rate thresholds are exceeded. In a particular case, current slew-rate detector module 140 is pre-configured with the one or more current slew-rate thresholds, based upon the current being monitored. In another case, current slew-rate detector module 140 operates to receive the one or more current slew-rate thresholds from BMC 122. In this case, power control system 100 can implement each current slew-rate module as a common device that is added to the power control system as needed or desired, and each added current slew-rate monitor module is then programmed by BMC 122 for its associated location. It will be understood that a current slew-rate monitor module may be implemented as a discrete element, or may be integrated into other elements of the information handling system as needed or desired. The input current signal to current slew-rate detector module 140 may be provided by any suitable current detection means, as is known in the art, such as by utilizing a loop current detector, a resistor-based current detector, or the like. Further details of current detection, being known in the art, will not be disclosed herein except as needed to illustrate the present embodiments. Note that, as used with respect to a current slew-rate detection module, the term "location" is used to mean a node or trace of a power rail from which the input current is sensed, or to otherwise situate the node or trace of the power rail within a power layout on a printed circuit board (PCB), at a connector, at a connection, such as a surface mount connection or the like, as needed or desired.

In operation, power control system 100 provides three mechanisms for controlling the flow of power to the loads of the information handling system that includes the power control system: a hardware protection mechanism as shown by the dashed signal lines, a fast firmware control loop as shown by the dotted signal lines, and a slow firmware control loop as shown by the solid signal lines. The hardware control mechanism is the fastest control mechanism and is primarily controlled by CPLD 118. Further, the hardware control mechanism provides a coarsest response, such as by applying a maximum throttling to the operations of the information handling system, and thus degrades performance more that the fast or slow firmware control loops. Here, CPLD 118 receives the SMB_ALERT signal from PSU 102 and the ALERT #signal from CPU VR 114. These signals each provide an indication that the respective sending element is in a critical load condition. For PSU 102 and CPU VR 116, the critical load conditions represent the fact that the PSU or the CPU VR are at a maximum loading and can supply no further current to their respective loads, leading to a potential voltage drop on one or more of their power rails. When CPLD 118 receives one or more of the critical load condition signals, the CPLD provides the PROCHOT #signal to CPU 126. In response, CPU 126 takes actions to lower the power consumption of the CPU, such as by lowering a performance state of the CPU by lowering one or more of an operating frequency or an operating voltage of the CPU, or shutting down internal units of the CPU, as needed or desired. CPLD 118 further responds to one or more of the critical load condition signals by providing the BRAKE signal to PCIe adapter 130 and NVMe interface 134. In response, PCIe adapter 130 and NVMe interface 134 take actions to lower their power consumption. The particular steps taken by a CPU, a PCIe adapter or device, or a NVMe interface to lower their respective power consumption are known in the art and are beyond the scope of the present disclosure, and will be described no further herein except as needed to further describe the present embodiments. Note that other hardware power control signals may be provided in a typical information handling system and that may make up other functions of the hardware protection mechanism. For example, a particular architecture may include a MEMHOT #or EVENT #signal for memory components. Other hardware based power control signals may be provided on other architectures, and such signals will be understood to be included in a hardware protection mechanism, as needed or desired. Further, the distinction between the hardware protection mechanism and the fast and slow firmware control loops is not intended to be exclusive. For example, a CPLD may further operate in response to a critical load condition to provide an interrupt to a BMC, and the BMC may then apply specific firmware-based controls in response.

The fast firmware control loop consists of the PSU_IMON signal and the distributed Sys_IMON signals. Here, CPU VR 114, PCIe adapter 130, and NVMe interface 134 respond to variations in the system current level, as indicated by the Sys_MON signal, as described above. The slow firmware control loop consists primarily of the I2C interfaces, through which BMC 122 operates to monitor, manage, and maintain PSU 102, CPU VR 114, CPU 126, PCIe adapter 130, and NVMe interface 134. The slow firmware control loop provides different regulation schemes in different platform load states, such as during emergency power-down conditions, or other load conditions or system operating states as needed or desired.

It has been observed by the inventors of the present disclosure that increasing power requirements in information handling systems, and particularly in dense processing environments such as a data center, are leading to current spikes that exceed the ability of present power supply solutions to maintain voltage levels within specified ranges. That is, if a current demand in the load of an information handling system has a slew-rate that exceeds the current slew-rate of the PSU powering the information handling system, the voltage level supplied by the PSU may drop to an unacceptably low level, thereby causing an under-voltage fault in the PSU. For example, a typical PSU may have a current slew-rate limit of 2 Amps per second (A/s) on its output, and so any current demand in the load on the information handling system that draws current with a slew-rate of greater than 2 A/s may cause an under-voltage fault on the PSU. This problem is particularly exacerbated when the information handling system includes various third-party components, such as general purpose graphics processing units (GPGPUs), field-programmable gate array (FPGA) devices, and the like, that may not be designed in conformance with various industry standards in terms of power demand and the like. Such current spike problems have been correlated by the inventors of the present disclosure with high current slew-rates on the power supply lines for the various subsystems of the information handling system.

In a particular embodiment, current slew-rate detector module 140 operates to detect the current slew-rate at the location of the information handling system, and to provide alerts to the BMC 122 via the I2C interface when the current slew-rate exceed a particular slew-rate threshold. In particular, current slew-rate detector module 140 includes signal processing circuits that operate to detect and characterize the current slew-rate. Then, when the current slew-rate exceeds a one or more slew-rate threshold, current slew-rate detector module 140 operate to provide indications to BMC 122 via the I2C interface. Here, current slew-rate detector module 140 may implement multiple current slew-rate thresholds, as needed or desired. Here, when the current slew-rate exceeds a first threshold, current slew-rate detector module 140 will provide a warning indication that the current slew-rate is increasing, but is not at an alert level. When the current slew-rate exceeds a second threshold, current slew-rate detector module 140 will provide a warning indication that the current slew-rate has increased beyond the warning level to the alert level. Finally, when the current slew-rate exceeds a third threshold, current slew-rate detector module 140 will provide a critical indication that the current slew-rate is above the critical level.

When BMC 122 receives an indication that the current slew-rate has exceeded one or more current slew-rate threshold, the BMC operates to trigger various responses on power control system 100 and on the associated information handling system. In a particular embodiment, BMC 122 operates to receive indications from current slew-rate detector module 140, such as warning indications, alert indications, and critical indications, and to log the indication in a system event log managed by the BMC. Here, the system event log can be maintained by a hosted environment of the information handling system, by the BMC in a non-volatile memory associated with the BMC, in an event manager of a management system for a data center that includes the information handling system, or in a combination thereof.

Further, BMC 122 operates to correlate indications of high current slew-rate with other power management functions of the information handling system and of power control system 100. For example, BMC 122 can operate to receive a warning indication from PSU 102, and can operate to mask other power quality indications, such as hardware indications from PSU 102 indicating an input power fault. Here, a typical operation of power control system 100 may include receiving an input power fault indication from PSU 102 or detecting the assertion of the SMB_ALERT signal from the PSU. Here, BMC 122 may operate to communicate to PSU 102 via the I2C interface to withhold the assertion of the SMB_ALERT signal while the current slew-rate is less than a particular indication level, such as the warning level, or the BMC may provide an input to CPLD 118 that operates to mask the SMB_ALERT to the CPLD until either an indication from current slew-rate detector module 140 of a higher level current slew-rate issue is received by the BMC, or an indication from the current slew-rate detector module that the current slew-rate issue has subsided. In this way, BMC 122 operates to filter out hardware faults that would tend to unnecessarily exercise the throttling functions of power control system 100, permitting the power control system to tide through minor current slew-rate issues. Additionally, BMC 122 operates to provide indications to a user of the information handling system that current slew-rate issues may be responsible for throttling events or other impacts to system performance.

As noted above, power control system 100 may include two or more PSUs similar to PSU 102. Here, in a typical operating mode, one or more PSU is active while one or more PSU is held as a hot-spare. Here, when the active PSU suffers a fault, the hot-spare can quickly be brought on line to maintain good power for the information handling system. In a particular embodiment, when BMC 122 receives an indication from current slew-rate detector module 140 of a current slew-rate issue, the BMC brings up one or more of the hot-spare PSUs in order to ensure that the current slew-rate issue does not affect the performance of the information handling system. Here, the presence of two or more active PSUs may permit the overall power supply to more readily supply current to handle the current slew-rate. For example, where a pair of PSUs each have a current slew-rate limit of 2 A/s, with one PSU operating as a hot spare PSU, a current slew-rate on the load that is greater than 2 A/s can be handled by bringing the hot spare PSU on line, such that the combined slew-rate limit of both PSUs would then be 4 A/s, thereby handling the current slew-rate of the load without triggering an under-voltage condition. When BMC 122 brings up one or more of the hot-spare PSUs, the BMC further provides an indication that the hot-spare PSUs have been activated, and that the hot-spare PSUs are not otherwise available in case of failure of a PSU. The indication may be provided to one or more of the hosted environment of the information handling system, to a log maintained by BMC 122, and to a management system of a data center that includes the information handling system.

In a particular embodiment, the information handling system includes various persistent memory architectures. Here, when BMC 122 receives an indication of a high current slew-rate, the BMC operates to trigger a persistent memory SAVE operation to direct the persistent memory to store the contents of volatile memory elements to their associated non-volatile memory elements in anticipation of a complete loss of power on the information handling system. Here, while the high current slew-rate may otherwise be insufficient to trigger a persistent memory SAVE operation, for example, because the current slew-rate issue is not sufficiently poor to cause PSU 102 to withdraw a POWER_OK signal or a Vin_GOOD signal, the current slew-rate may be sufficiently bad to cause the charge on the bulk capacitor of the PSU to be reduced to a level that is insufficient to sustain the voltage on the power rails for a long enough duration to perform the persistent memory SAVE operation. For example, where a persistent memory architecture includes 3D Xpoint memory, a power supply may be expected to provide sufficient voltage on the power rails for up to 2 milliseconds (ms) after the loss of the POWER_OK or Vin_GOOD signals. In another example, where a persistent memory architecture includes N-type non-volatile DIMMs (NV-DIMM-Ns), a power supply may be expected to provide sufficient voltage for 3 ms before the loss of the POWER_OK signal to permit the a backup power supply or battery to provide an output voltage, and so the information handling system may typically rely on the deassertion of the Vin_GOOD signal to trigger the backup power supply or battery to come on line. Here, BMC 122 substitutes an indication that the current slew-rate is high and that a bulk capacitor charge on PSU 102 is lower than a persistent memory SAVE operation level, and triggers the backup power supply or battery to come on line without the deassertion of the Vin_GOOD signal. In a particular case, where a PSU subsystem is assessed as being in a redundant state, that is, with at least one hot spare PSU, the detection of a current slew-rate that is higher than a single PSU's slew-rate limit would serve to indicate that the PSU subsystem is in fact operating in the non-redundant state. Here, when the PSU subsystem is operating in the redundant state, a SAVE operation is typically not triggered until both PSUs have indicated a fault. However, having detected that the PSU subsystem is in fact operating in the non-redundant state, the SAVE operation would be triggered as soon as a single PSU indicates a fault, as the remaining PSU would also be unable to handle the slew-rate alone.

In another embodiment, the information handling system implements a throttling policy for various power conditions detected on power control system 100. Here, when BMC 122 receives an indication of a high current slew-rate, the BMC operates to trigger the throttling policy in order to reduce the load on drawn by the information handling system in order to permit the bulk capacitor of PSU 102 adequate opportunity to recharge to handle a full load on the information handling system.

FIG. 2 illustrates a method of using power line input telemetry in an information handling system, starting at block 200. A current slew-rate detector module detects the current slew-rate at a location of an information handling system in block 202. For example, a current slew-rate detector module may be associated with an overall system current for each particular voltage rail from a PSU of an information handling system, may be associated with a particular subsystem of the information handling system, such as a memory subsystem, an I/O subsystem, the like, or may be associated with one or more CPU VR or VR controller of the information handling system, or may be associated with the current at another location of the information handling system. A decision is made as to whether or not the current slew-rate exceeds a current slew-rate threshold in decision block 204. For example, the detected current slew-rate can exceed a first current slew-rate threshold, indicating that the current slew-rate is at an alert level, the detected current slew-rate can exceed a second current slew-rate threshold, indicating that the current slew-rate is at a warning level, or the detected current slew-rate can exceed a third current slew-rate threshold, indicating that the current slew-rate is at a critical level.

If the detected current slew-rate does not exceed a current slew-rate threshold, the "NO" branch of decision block 204 is taken, and the method returns to block 202, where the current slew-rate detector module detects the current slew-rate at the location of the information handling system. If the detected current slew-rate exceeds a current slew-rate threshold, the "YES" branch of decision block 204 is taken, and the current slew-rate detector module sends an indication to a BMC of the information handling system in block 206. For example, when the detected current slew-rate exceeds the first current slew-rate threshold, the power monitor module sends a current slew-rate alert indication that the detected current slew-rate is at the alert level, when the detected current slew-rate exceeds the second current slew-rate threshold, the power monitor module sends a current slew-rate warning indication that the detected current slew-rate is at the warning level, or when the detected current slew-rate exceeds the third current slew-rate threshold, the power monitor module sends a current slew-rate critical indication that the detected current slew-rate is at the critical level. The method then proceeds to block 208, where the BMC mitigates the current slew-rate issue for the information handling system. For example, the BMC may write to a log maintained by the host environment of the information handling system, to a log maintained by the BMC, or to a log maintained by a management system of a datacenter that includes the information handling system, the BMC may throttle one or more component of the information handling system, the BMC initiate a persistent memory save operation, or the BMC may take other actions as described above. The method ends in block 210.

The utilization of a current slew-rate detector module, as described above, permits the quick detection of high current slew-rates and rapid response to minimize the load that the PSU subsystem must handle. In a particular embodiment, a throttling response is masked until PSU redundancy is lost. For example, where there are two PSUs, and a single PSU cannot handle the current slew-rate of the load, then an information handling system can induce throttling only if there was a fault that reduced the number of active PSUs from two to one. Such functionality could be provided by hardware logic in, for example, a CPLD that qualifies a slew-rate based throttle request signal with the number of active PSUs (POK).

Figure 3:
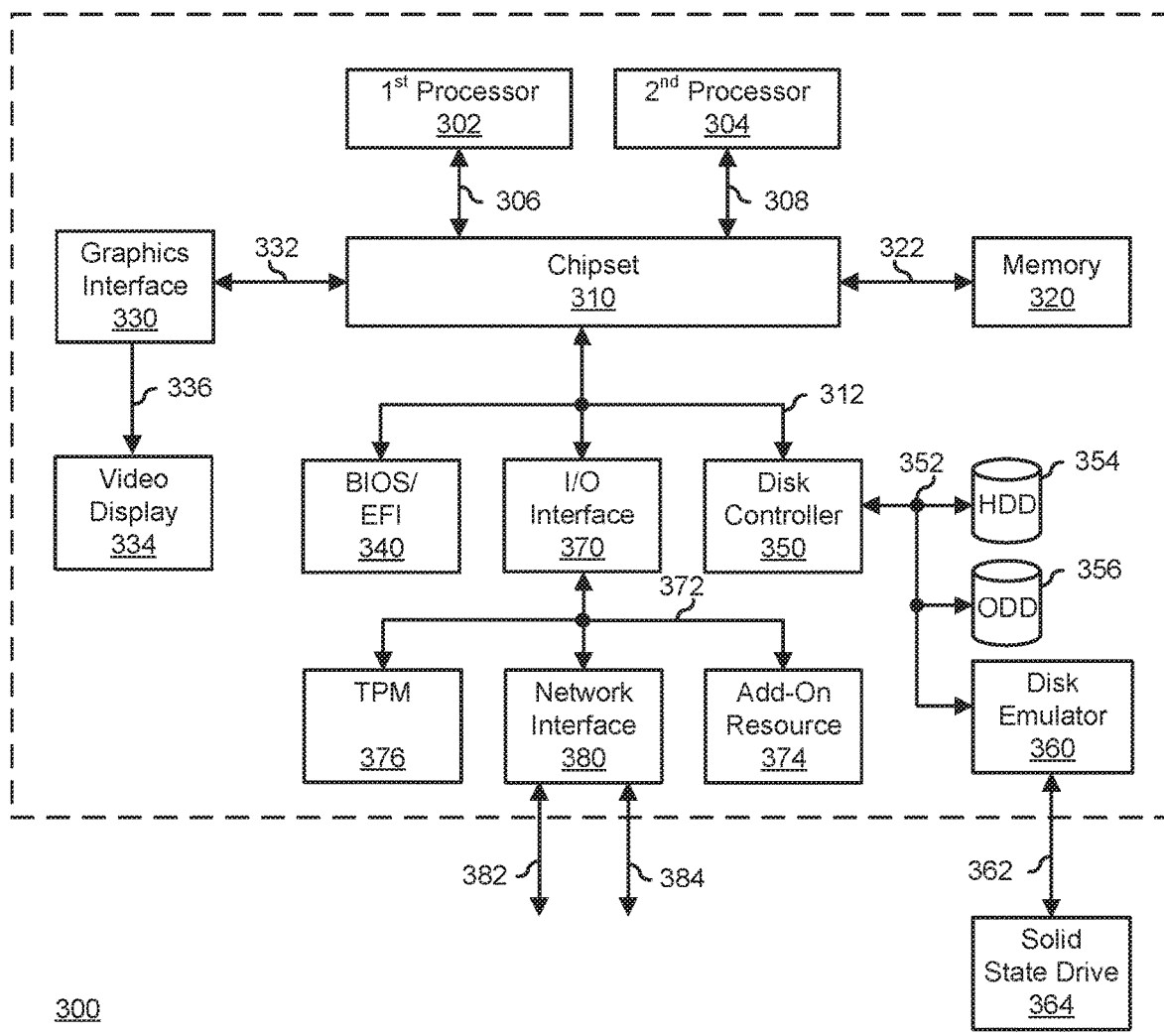
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/IFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a. Field Programmable Gate Array (FPGA), a structured ASIC, or a device embedded on a larger chip), a card (such as a Peripheral Component interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
  a current detector module including a communication interface, wherein the current detector module is configured to detect current slew-rate for an element of the information handling system, to determine that the current slew-rate is greater than a first current slew-rate threshold, to provide a first indication that the current slew-rate is greater than the first current slew-rate threshold on the communication interface, to determine that the current slew-rate is greater than a second current slew-rate threshold, and to provide a second indication that the current slew-rate is greater than the second current slew-rate threshold on the communication interface, the second current slew-rate threshold being greater than the first current slew-rate threshold; and
  a baseboard management controller (BMC) coupled to the communication interface, the BMC configured to receive the first indication and to enter a first item into a log of the information handling system in response to receiving the first indication, and to receive the second indication.

2. The information handling system of claim 1, wherein the BMC is further configured to reduce a power consumption level of the information handling system in response to receiving the second indication.

3. The information handling system of claim 2, wherein in reducing the power consumption level, the BMC is further configured to throttle a device of the information handling system.

4. The information handling system of claim 2, wherein in reducing the power consumption level, the BMC is further configured to disable a device of the information handling system.

5. The information handling system of claim 1, further comprising:
  a persistent memory device;
  wherein the current detector module is further configured to determine that the current slew-rate is greater than a third current slew-rate threshold, and to provide a third indication that the current slew-rate is greater than the third current slew-rate threshold on the communication interface, the third current slew-rate threshold being greater than the second current slew-rate threshold; and wherein the BMC is further configured to receive the third indication, and to initiate a save operation on the persistent memory device in response to receiving the third indication.

6. The information handling system of claim 1, wherein the current detector module receives a current level signal, the current slew-rate being determined based upon the current level signal.

7. The information handling system of claim 6, wherein the current level signal is based upon a loop current detector.

8. The information handling system of claim 6, wherein the current level signal is based upon a resistor-based current detector.

9. The information handling system of claim 6, wherein the current detector module receives the current level signal as an analog signal.

10. The information handling system of claim 9, wherein the current detector module includes an analog-to-digital converter, and wherein the determining that the current slew-rate is greater than a first current slew-rate threshold is based upon a digital signal output from the analog-to-digital converter.

11. A method, comprising:
  detecting, by a current detector module of an information handling system, a current slew-rate for an element of the information handling system;
  determining, by the current detector module, that the current slew-rate is greater than a first current slew-rate threshold;
  providing, via a communication interface of the current detector module, a first indication that the current slew-rate is greater than the first current slew-rate threshold;
  receiving, by a baseboard management controller (BMC) of the information handling system coupled to the communication interface, the first indication;
  entering, by the BMC, a first item into a log of the information handling system in response to receiving the first indication;
  determining, by the current detector module, that the current slew-rate is greater than a second current slew-rate threshold, the second current slew-rate threshold being greater than the first current slew-rate threshold;
  providing, via the communication interface, a second indication that the current slew-rate is greater than the second current slew-rate threshold;
  receiving, by the BMC, the second indication.

12. The method of claim 11, further comprising:
  reducing, by the BMC, a power consumption level of the information handling system in response to receiving the second indication.

13. The method of claim 12, wherein in reducing the power consumption level, the method further comprises at least one of:

throttling, by the BMC, a device of the information handling system; and
  disabling, by the BMC, the device.

14. The method of claim 11, further comprising:
  determining, by the current detector module, that the current slew-rate is greater than a third current slew-rate threshold, the third current slew-rate threshold being greater than the second current slew-rate threshold;
  providing, via the communication interface, a third indication that the current slew-rate is greater than the third current slew-rate threshold;
  receiving, by the BMC, the third indication; and
  initiating, by the BMC, a save operation on a persistent memory device of the information handling system in response to receiving the third indication.

15. The method of claim 10, further comprising:
  receiving, by the current detector module, a current level signal, the current slew-rate being determined based upon the current level signal.

16. The method of claim 15, wherein the current level signal is based upon a loop current detector.

17. The method of claim 15, wherein the current level signal is based upon a resistor-based current detector.

18. The method of claim 15, further comprising:
  receiving, by the current detector module, the current level signal as an analog signal.

19. The method of claim 18, wherein the current detector module includes an analog-to-digital converter, and wherein the determining that the current slew-rate is greater than a first current slew-rate threshold is based upon a digital signal output from the analog-to-digital converter.

20. An information handling system, comprising:
  a voltage regulator module for a processor, the voltage regulator module including a current detector module and a communication interface, wherein the current detector module is configured to detect current slew-rate for an element of the information handling system, to determine that the current slew-rate is greater than a first current slew-rate threshold, to provide first indication that the current slew-rate is greater than the first current slew-rate threshold on the communication interface, to determine that the current slew-rate is greater than a second current slew-rate threshold, and to provide a second indication that the current slew-rate is greater than the second current slew-rate threshold on the communication interface, the second current slew-rate threshold being greater than the first current slew-rate threshold; and
  a baseboard management controller (BMC) coupled to the communication interface, the BMC configured to receive the first indication, to direct the voltage regulator module to decrease a performance level of the processor in response to receiving the first indication, and to receive the second indication.

* * * * *